Dec. 4, 1945.  J. GELB  2,390,065
PHOTOGRAPHIC CAMERA-ENLARGER
Filed July 14, 1942  12 Sheets-Sheet 1

Dec. 4, 1945.   J. GELB   2,390,065
PHOTOGRAPHIC CAMERA-ENLARGER
Filed July 14, 1942   12 Sheets-Sheet 2

INVENTOR.
Joseph Gelb
BY
H. Lee Helme
ATTORNEY.

Dec. 4, 1945. J. GELB 2,390,065
PHOTOGRAPHIC CAMERA-ENLARGER
Filed July 14, 1942 12 Sheets-Sheet 3

INVENTOR
Joseph Gelb
H. Lee Heline
ATTORNEY

Dec. 4, 1945. J. GELB 2,390,065
PHOTOGRAPHIC CAMERA-ENLARGER
Filed July 14, 1942 12 Sheets-Sheet 5

INVENTOR.
Joseph Gelb
ATTORNEY

Dec. 4, 1945.   J. GELB   2,390,065
PHOTOGRAPHIC CAMERA-ENLARGER
Filed July 14, 1942   12 Sheets-Sheet 8

INVENTOR.
Joseph Gelb
BY W. Lee Helms
ATTORNEY.

Dec. 4, 1945. J. GELB 2,390,065
PHOTOGRAPHIC CAMERA-ENLARGER
Filed July 14, 1942 12 Sheets-Sheet 9

INVENTOR
Joseph Gelb
BY
ATTORNEY

Dec. 4, 1945.  J. GELB  2,390,065
PHOTOGRAPHIC CAMERA-ENLARGER
Filed July 14, 1942   12 Sheets-Sheet 10

Dec. 4, 1945. J. GELB 2,390,065
PHOTOGRAPHIC CAMERA-ENLARGER
Filed July 14, 1942 12 Sheets-Sheet 11

INVENTOR
Joseph Gelb
BY
W. Lee Helms
ATTORNEY

Dec. 4, 1945.                    J. GELB                    2,390,065
                      PHOTOGRAPHIC CAMERA-ENLARGER
                     Filed July 14, 1942         12 Sheets-Sheet 12

INVENTOR.
Joseph Gelb
BY
W. Lee Helms
ATTORNEY.

Patented Dec. 4, 1945

2,390,065

UNITED STATES PATENT OFFICE 2,390,065

PHOTOGRAPHIC CAMERA-ENLARGER

Joseph Gelb, New York, N. Y.

Application July 14, 1942, Serial No. 450,875

4 Claims. (Cl. 88—24)

The object of the present invention is to provide a photographic camera-enlarger embodying improvements over devices of the kind now in use to enable more rapid and accurate adjustment of various elements, quicker and accurate placement of a negative in enlarging work, better application of pressure to the negative and release of pressure therefrom; an improved control of heat generated by the lamp and the lamp house; an improved mounting and arrangement of the condenser elements; an improved counterbalance and adjustment for the enlarger head; an automatic control of light volume through the negative in enlarging so that the light volume is automatically varied in accordance with changes in the size of the enlargement; the employment of means for increasing the normal output of light intensity from a light source and control of color temperature. These and other features of the invention will be described with reference to the accompanying drawings, in which:

Figure 1:
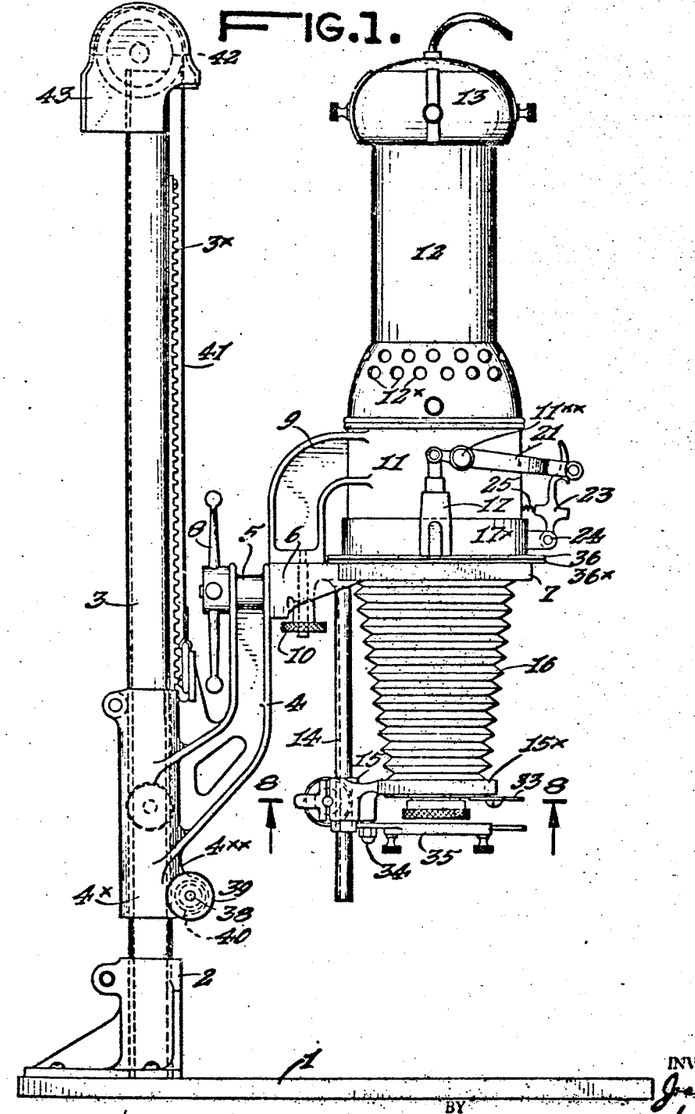
Figure 1 is a view in side elevation illustrating an embodiment of the invention.
Figures 2, 3, 4:
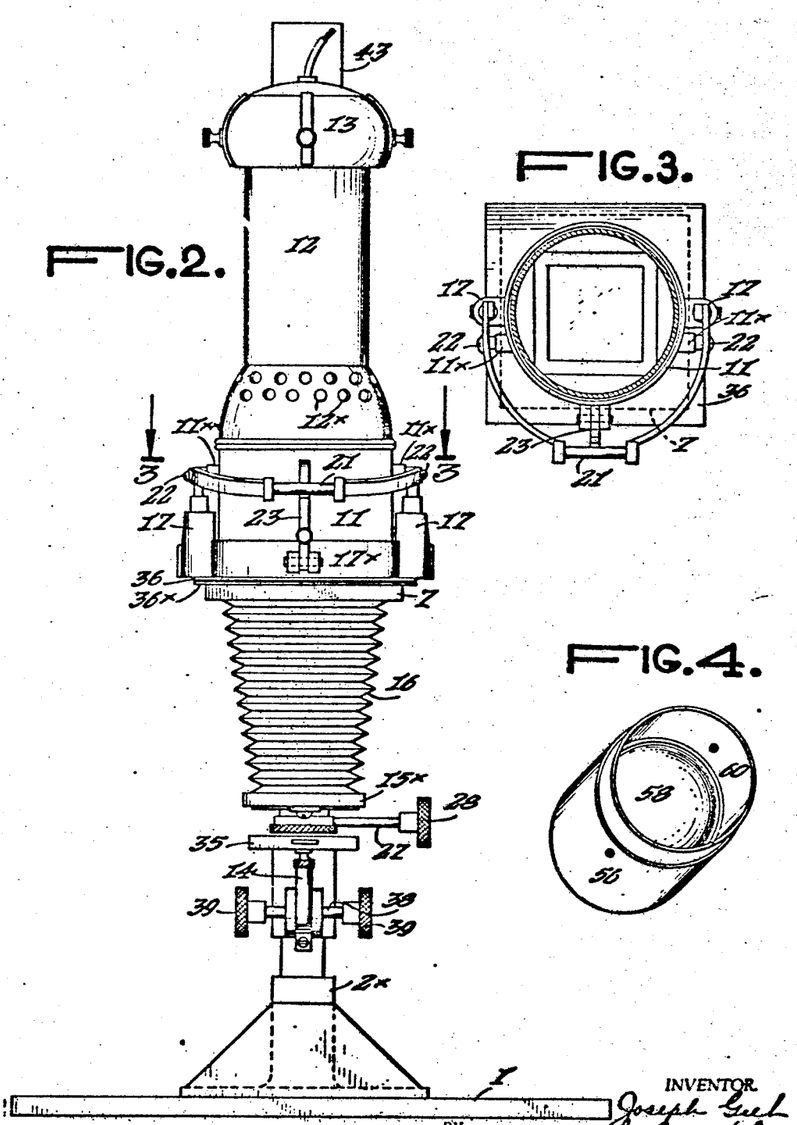
Figure 2 is a view similar to Figure 1, showing said embodiment in front elevation.
Figure 3 is a transverse horizontal section on the line 3—3, Figure 1, taken through the condenser mounting.
Figure 4 is an isometric view illustrating the condenser assembly.

Referring to the drawings, and particularly Figures 1 and 2, the embodiment therein shown comprises a base board 1 carrying a split clamping sleeve 2 or an unbroken sleeve 2x as shown in Figure 2, which receives tubular standard 3. Slidably mounted on the tubular standard is the sleeve 4x of the bracket 4 having at its top a horizontal bearing boss 5. Within boss 5 is a horizontal shaft projected from a block 6 which carries ring 7. The shaft (not shown) is threaded to receive the threaded hub of a clamp 8. Rising from block 6 is a bracket arm 9. The bracket arm 9 is secured to the block by means of a threaded retaining screw 10 which passes through the block. Bracket arm 9 is immediately carried by a condenser casing 11 which is cylindrical in form and which is flanged at its top to receive the flanged outwardly-flared lower portion of a lamp housing 12. As customary, the lower flared section of the lamp housing is perforated at 12x for the passage of cooling air and the top of the housing has applied thereto a cooling hood 13.

Block 6 supports a depending rod 14 and slidably mounted on the rod is a focusing bracket 15 having a ring extension 15x. This ring carries the lower end of a bellows 16, the upper end being carried by ring 7.

Figure 7:
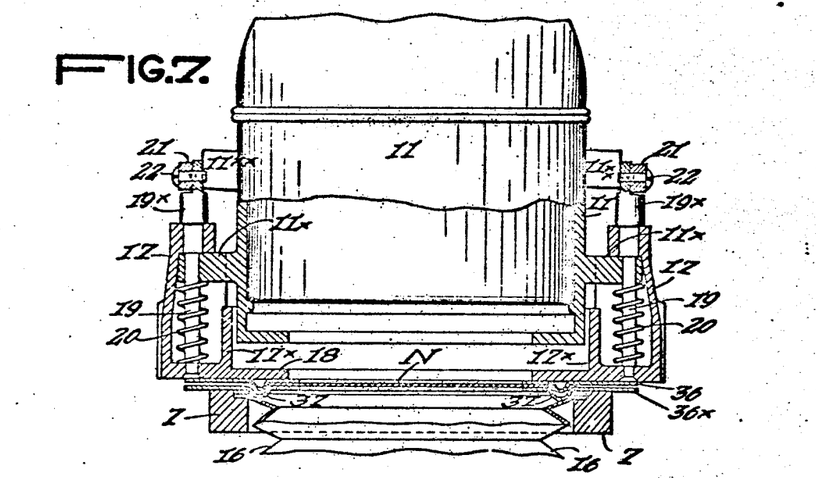
Figure 7 is a fragmentary view, in elevation, partly in section, illustrating construction of the pressure plate.

Mounted to slide up and down on the cylindrical lower end of condenser housing 11 is the upwardly extending ring area 17x of a pressure plate 18. As shown in Figure 2, the ring-shaped area of the pressure plate is integrally formed with opposed cups 17. As shown in Figure 7, the condenser housing 11 is laterally provided with short arms 11x, each of which projects into into one of the cups.

*The pressure plate*

Carried by the pressure plate and projecting upwardly into the cups 17 (Figure 7) are posts 19. Surrounding the posts and bearing at their tops against arms 11x and at their bottoms against the pressure plate, are spiral springs 20. These springs normally hold the pressure plate downward firmly and yet with yielding spring pressure. The pressure plate may be raised against the tension of the springs by the following means: Pivoted in short enlargements 11xx on the exterior of the condenser housing 11 are the arms of a swing lever 21. Each arm is also pivoted at 22 to the enlarged head 19x of one of the posts 19. Inasmuch as the lower ends of the posts are secured to the pressure plate, the raising of the rods will elevate the pressure plate against the tension of the springs 20, and a latch is provided holding the pressure plate in elevated, and thus, in released position.

The latch is shown in Figure 1 at 23, its lower end is pivoted at 24 and its upper end is provided with a curved finger piece below which is a hook extension adapted to fit over the central or handle portion of swing lever 21. The latch is normally pressed into operative position by a spring 25.

In the operation of the pressure plate, release of the latch will enable the spring 20 to move the pressure plate downward into operative position. The pressure plate is released, i. e., raised, by swinging handle 21 downwardly until it is engaged by the latch.

*The bellows adjustment*

As hereinbefore stated, the focusing bracket 15 is mounted to slide on vertical rod 14. As seen by reference to Figures 6 and 8, rod 14 is formed with a vertical channel into which is projected a friction disk 26 carried by a shaft 27 having one or more thumb wheels 28. Block 15 is formed with a semi-annular transverse passageway for shaft 27 and a retaining plate 29 secured to the block likewise formed with a horizontal semi-annular passageway, complements the bearing aperture for shaft 27. Retaining plate 29 is formed with two hollow spring-receiving enlargements 29x, a spiral spring being disposed in each enlargement. In front of each spring is a grooved block 30 for exerting frictional pressure upon shaft 27 the pressure being communicated from the shaft to disk 26 and hence upon the walls of the channelway or groove in rod 14.

Ring 15x secured to the focusing bracket or block 15 is formed with a lower recess to receive a lens mounting plate 31 (Figures 6 and 8) which may lie over lugs 32 carried by ring 15x and may be held in position by a releasable catch 33.

Figures 5, 6:
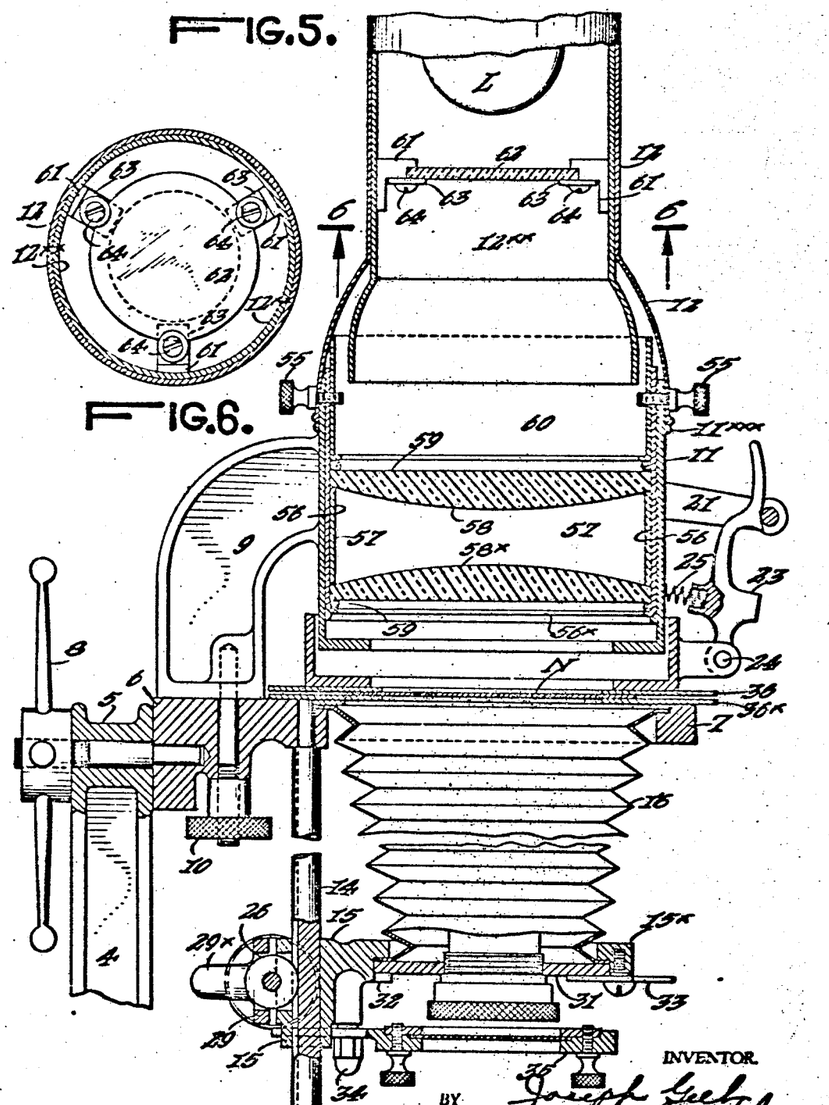
Figure 5 is an enlarged vertical section taken through the lamp house condenser casing and condenser assembly, also through the pressure plate, the negative holder and the upper part of the bellows extension and certain associated elements.
Figure 6 is a horizontal section taken on the line 6—6, Figure 5, looking in the direction of the arrows.

As shown in Figures 1 and 6, the focusing bracket or block 15 may carry a depending headed stud 34 pivotally mounting a filter carrier 35 of any suitable construction.

The negative carrying plates

Figures 8, 10:
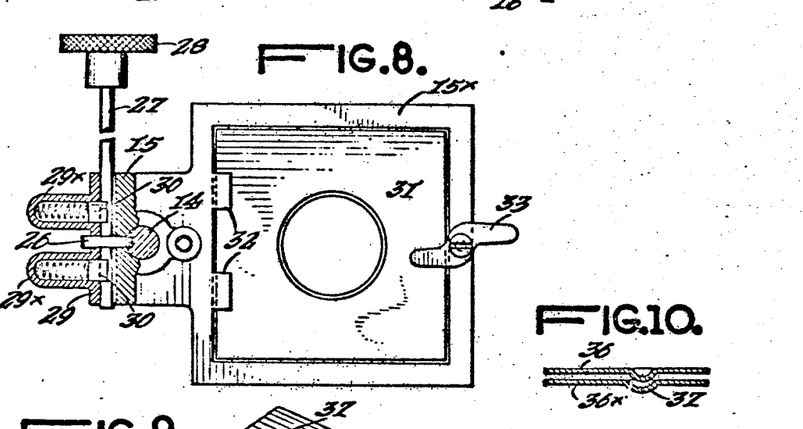
Figure 8 is a horizontal section taken on the line 8—8, Figure 1.
Figure 10 is a fragmentary section taken vertically on the line 10—10, Figure 9.
Figure 9:
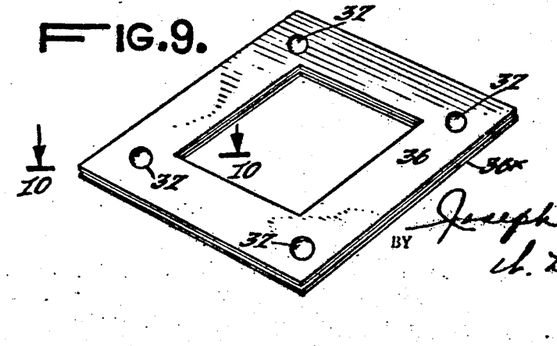
Figure 9 is a perspective view showing the negative-carrying plates in assembly.

The negative carrying plates 36, 36x are best shown in Figures 7, 9 and 10. Each plate is formed with four centering hollow nipples 37. The lowermost negative carrying plate 36 is self-centering with respect to ring 7. In the use of the term "ring" in this connection, I include either an annular form or the rectangular form shown in the embodiment illustrated. The said lower negative carrying plate is self-centered because its hollow nipples 37 project downwardly into abutment with the inner wall of ring 7. The upper negative carrying plate is self-centering with respect to the lower plate because its set of hollow nipples fit into those of the lower plate as shown in Figure 7.

In Figure 7 of the drawings, a negative N is shown between the negative carrying plates. The adjustment for the camera-enlarger will now be described.

The vertical positioning of the camera-enlarger

As hereinbefore set forth, the sleeve of bracket 4 which carries the assembled camera-enlarger is mounted to slide on a tubular standard 3. Applied to the exterior of the standard is a rack 3x. In the construction shown in Figures 1, 15 and 37, the sleeve 4x is provided with one or more bearing bosses 4xx to receive a shaft 38 which may be turned by a thumb wheel 39. On the shaft also is a pinion indicated by dotted lines at 40, Figure 1, the pinion engaging the rack. By rotating thumb wheel 39, the camera-enlarger may be raised and lowered relatively to the tubular standard 3. A counterbalance is employed, which counterbalance comprises a metallic tape 41 secured at its lower end to bracket 4. In the structure illustrated in Figure 1, the tape is connected to a pulley 42 rotating in a housing 43 secured to the upper end of tubular standard 3, and a spring spirally wound around the shaft, having its free end connected to the pulley and its inner end fixed to the shaft, may be employed for exerting the counterbalancing force. This spring is not illustrated in the drawings. The alternative of the spring is a weight and in other forms of the invention a weight is illustrated. These forms will be found illustrated in Figures 11, 12 and 37. The form illustrated in Figure 11 employs a pulley in housing 43 over which tape 41 is led and thence extended downwardly in the hollow standard 3 to a point of connection with a weight 44.

Figures 11, 12, 13, 14:
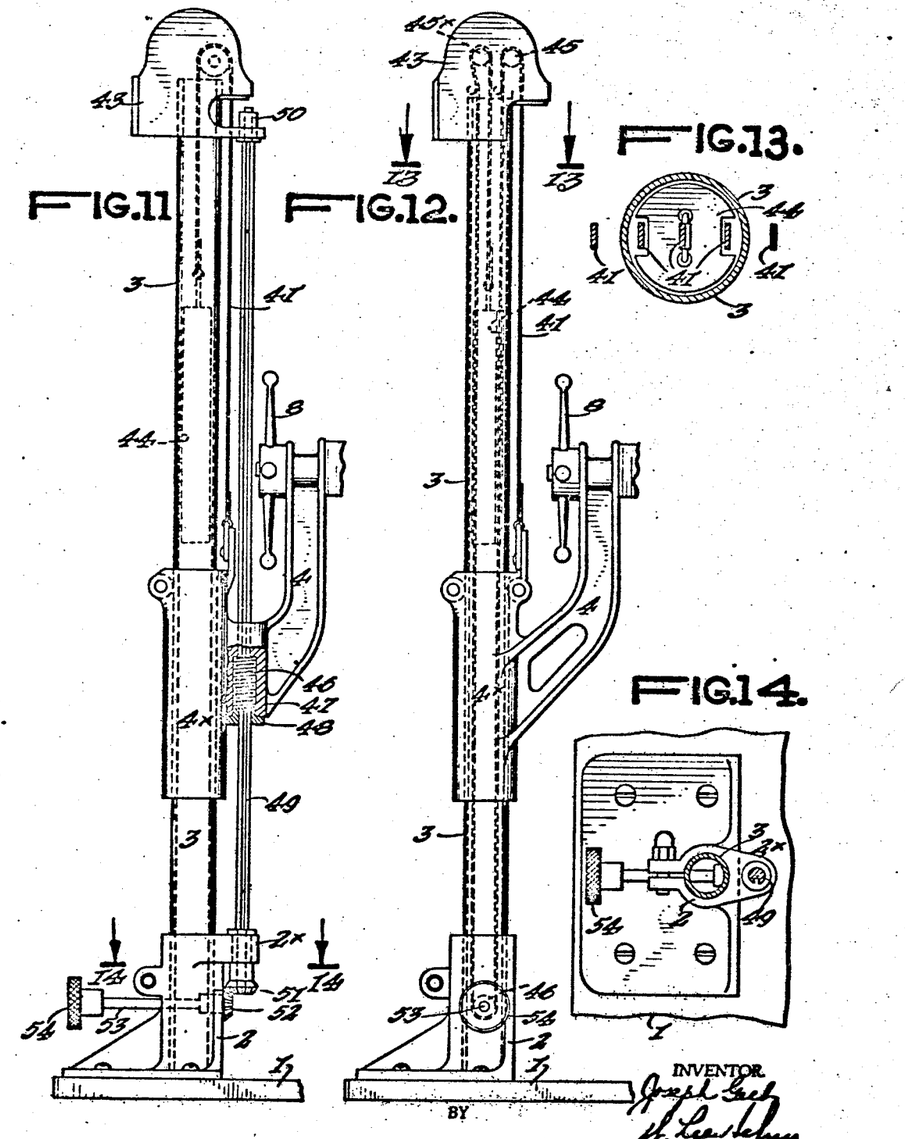
Figure 11 is a view in elevation, partly broken away, showing the tubular standard, the slide bracket for the enlarger assembly and modified means for counterbalancing and for vernier adjustment of the bracket and the elements carried thereby, the figure being taken at the side of the standard.
Figure 12 is a view similar to Figure 11, illustrating a modified lead arrangement for the metallic tape carrying the counterbalance weight and leading from the bracket.
Figure 13 is a fragmentary horizontal section taken on the line 13—13, Figure 12.
Figure 14 is a horizontal section on the line 14—14, Figure 11.

In the structure of Figure 12, tape 41 is led over a small pulley 45 in housing 43 and thence extends to the base of the housing over a small pulley 46 and thence extends upwardly over a second pulley 45x in housing 43, the tape thence leading downwardly to its connection with weight 44.

Figure 37:
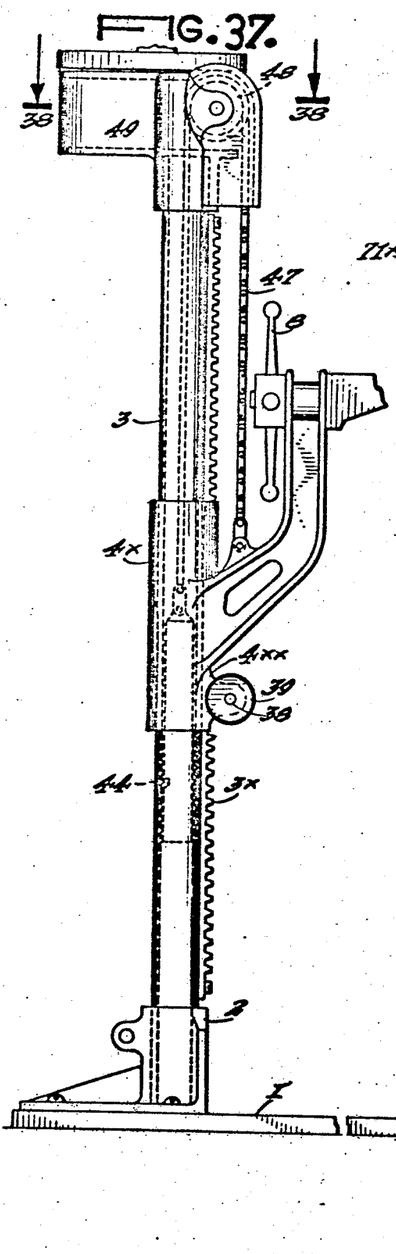
Figure 37 is a side elevation of the tubular standard, the enlarger-camera carrying bracket and associated elements, a standard carrying at its top a casing for the light intensity control.

In the construction of Figure 37, a chain 47 is substituted for the steel tape, the chain being led over a pinion 48 in a housing 49 at the top of the hollow standard 3, the chain then extending downwardly in the housing to the weight 44.

The combination of counterbalance with vernier control for the camera-enlarger In all of the forms with the exception of that illustrated in Figure 11, the tubular standard 3 carries a rack engaged by a pinion on a shaft controlled manually by a thumb wheel. The pinion and thumb wheel are carried by a supporting bracket for the camera-enlarger which in turn is connected to a counterbalance through the medium of a steel tape or chain. As hereinbefore described, the counterbalance may be a spiral spring controlling the movement of a drum or pulley to which the tape or chain is secured, or may be a weight movable within the tubular standard, or any equivalent for the spring or weight. There is thus provided a counterbalance vernier adjustment for the camera-enlarger.

In the structure of Figure 11, the rack is substituted by a worm adjustment. The worm 46 is disposed within a vertical chamber formed in a boss 47 by bracket 4, the chamber being closed at its lower end by a cap plate 48. The worm is provided at its apertured axis with a key entering a longitudinal slot in a light shaft 49 which passes through the cap plate 48 and the upper wall of the chamber in boss 47. At its upper end shaft 49 is supported for rotation in a bearing member 50 carried by housing 43, and at its lower end the shaft rotates in the bushed projection 2x of bracket 2. The lower end of shaft 49 carries a bevelled gear 51 in mesh with a drive gear 52 on the end of a shaft 53 having a thumb wheel 54. When the thumb wheel is rotating, bracket 4 and the camera-enlarger carried thereby and counterbalanced by weight 44, may be given a vernier adjustment with ease.

Referring to Figure 12 the function of the long leads of steel tape 41, the tape projecting upwardly from bracket 4x over a guide pulley, thence to the base of the tubular standard 3 and up from a guide pulley at said point again to the top of the standard and thence downwardly to the weight is as follows:

The arrangement permits the use of the same thumb wheel 54 and shaft 53, at the base of the tubular standard, as employed in the structure of Figure 11. The pulley 46 is fixed to shaft 53 and the pulley acts as a drive member for tape 41. In actual practice, friction alone between the pulley 46 and the tape will not be relied upon. Thus the pulley 46 may have a toothed periphery to enter spaced apertures formed in the tape. For clarity of illustration this has not been shown in the drawings.

It will also be understood that in the structure of Figure 11, the weight may be longitudinally apertured as at its axis and the connection between the tape and the weight may be adjacent the aperture. This will permit shaft 49 to be placed within the tubular standard 3 and extending through the weight, the interior of the weight having a threaded sleeve receiving the worm 46. The construction is the same in principle and its advantage is merely in eliminating the exterior position of the said vernier adjusting parts.

The condenser unit

The condenser elements occur within the condenser housing 11 as a unit and may be readily and bodily removed therefrom. As shown more particularly in Figure 5, the outwardly flared lower end of the lamp house 12 fits over the top area of the condenser housing, resting upon an annular flange 11xxx. Threaded studs 55 are employed to secure the lamp house in position. Upon removal of these studs the lamp house may be raised to expose the top of the condenser unit. The latter consists of an outer sleeve 56 within which is a spacer ring 57 for the lenses 58, 58x.

The top lens 58 rests upon the rim of spacer ring 57. At its upper margin may be positioned a sealing ring of rubber or any other suitable material indicated at 59 which is pressed downward by a friction ring 60 having a horizontally inturned flange at its base. The lower lens 58x rests upon a second sealing ring 59 which is held in position by the inturned lower edge of the condenser sleeve 56x. I prefer that the friction ring 60 of the condenser unit be apertured to receive the threaded ends of thumb screws 55 so that the latter may be of adequate length.

Assembly and disassembly of the condenser unit above described is very simple. Assembly merely requires placement of the sealing ring 59 on the inturned flange 56x of the condenser sleeve followed by insertion of the spacer ring 57, whereupon the upper lens may be placed on the top of the spacer ring, the sealing ring 59 inserted, and the whole assembly frictionally held together by depression of the friction ring 60. If desired, ring 60 may be threaded within the condenser sleeve 56 so as to exert a controllable pressure upon the sealing rings 59 and hence upon the lens peripheries.

Heat absorption for the lamp in protection of the condensers and negative

The condensers and the negative are substantially protected from undue heat emanated from the lamp L by a transparent heat-absorbing medium or mediums interposed between the lamp and the upper condenser. An embodiment is illustrated in Figures 5 and 6 wherein the inner member 12xx of the lamp house carries a plurality of bracket arms 61 which receive a transparent heat-absorbing plate 62 held in position by heat-insulated clips 63 secured to the brackets 61 by screws 64.

Figure 25:
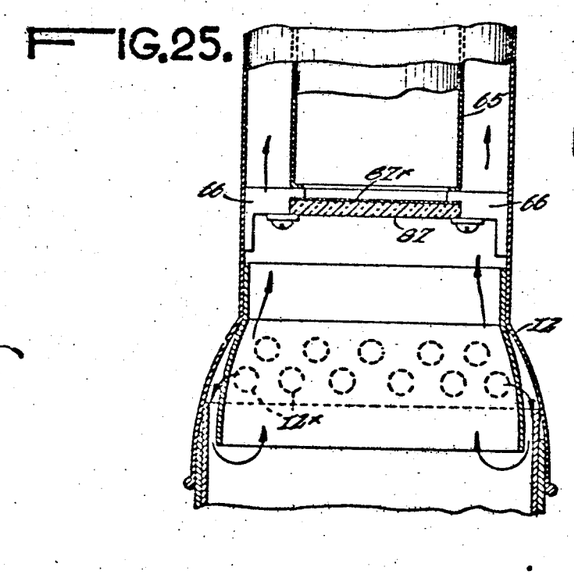
Figure 25 is a vertical section through the lamp house showing a cylindrical heat-absorbing member for the lamp and below the same a fluorescent or phosphor-fluorescent member for increasing the intensity of light.

A modified form of heat-absorption member is illustrated in Figure 25 wherein the lamp housing 12 receives a heat-absorbing cylinder 65 which is secured to bracket arms 66. The heat is absorbed by member 65 by radiation from the lamp. Inasmuch as the cylindrical heat-absorbing member 65 is spaced from the inner wall of the lamp house 12 and the flaring base of the latter is perforated at 12x, air will enter the perforations and will travel in the path of the arrows, Figure 25, upwardly in the annular space surrounding the cylindrical heat-absorbing member 65, carrying heat from the latter to the hood 13 (Figure 2) and to the outside.

Automatic control of illumination in focusing

Figure 38:
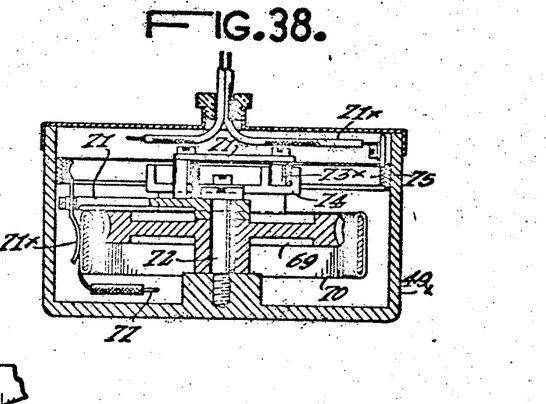
Figure 38 is a vertical section through the light control casing taken at right angles to its position in Figure 37.
Figure 39:
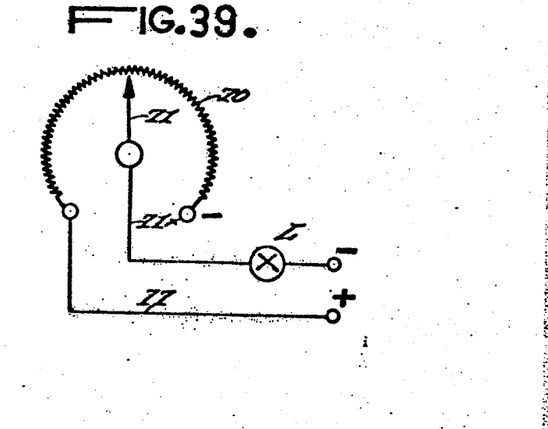
Figure 39 is a schematic view showing the rheostat and wiring.

Means are provided for automatically adjusting the intensity of the light in accordance with the size of image to be projected from the negative to the sensitized sheet. In Figures 33 to 36 inclusive and also Figures 37 to 39 inclusive, an embodiment of such control is illustrated.

Referring to Figure 37, it will be noted that the counterbalancing chain 47 is led over pulley 48 in housing 49 at the top of the tubular standard. This pulley is on a shaft 67. Pulley 48 is formed with sprocket teeth to engage the links of the chain. On shaft 67 is a worm 68 which drives a wormwheel 69 within housing 49x. Arcuately formed within housing 49x circumferentially of worm wheel 69 is a rheostat 70 engaged by a contact arm 71 through the intermediary of its contact finger 71x, Figure 38. Contact finger 71x constitutes, with its arm 71, part of the return lead from the rheostat to the lamp L as shown by the wiring diagram, Figure 39. Arm 71 is loosely mounted on shaft 72 for worm wheel 69 and is pivotally connected to a drive link 73 having at its outer end a roller 73x entering the V-shaped channel of a cam 74 carried by worm wheel 69. The function of cam 74 is to move rheostat control arm 71 at speeds varying with the speed of rotation of worm wheel 69, thereby automatically adjusting intensity of the light in accordance with the size of the projected image.

As the camera-enlarger is raised from the base board, the size of the enlargement will be increased and the normal illumination through the negative and to the base board will be increased. The arm 71 feeds to the lamp conductor 71x by sliding engagement with a contact ring 75, Figure 38. The positive lead to the rheostat is indicated at 77.

Figure 29:
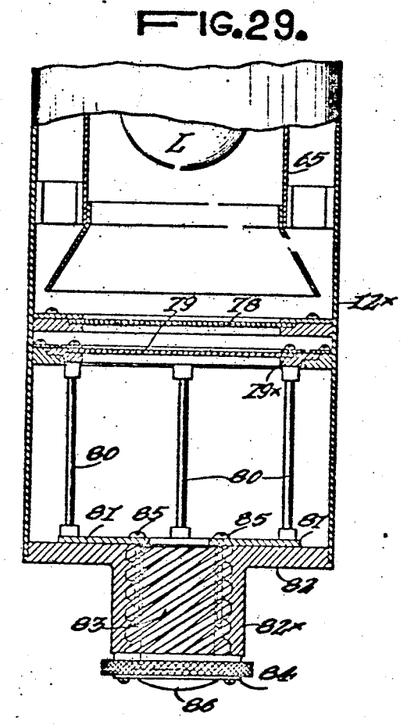
Figure 29 is a view in elevation, partly in vertical section, showing a modified form of focusing arrangement for the lenses connected to means for varying the intensity of the light in accordance with the size of enlargement, the adjustment being for maximum enlargement.
Figure 30:
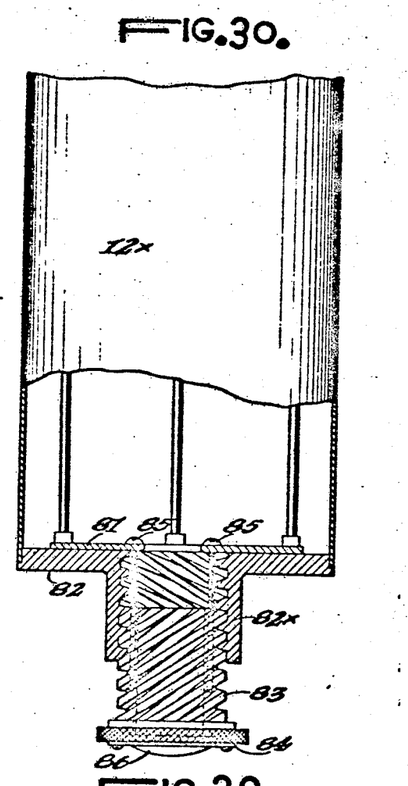
Figure 30 is a view similar to Figure 29, showing the lenses adjusted downwardly to decrease the size of enlargement.
Figure 31:
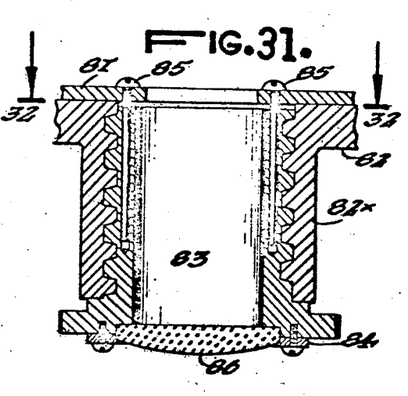
Figure 31 is an enlarged view of the adjustable lens mounting illustrated in the two preceding figures.
Figure 32:
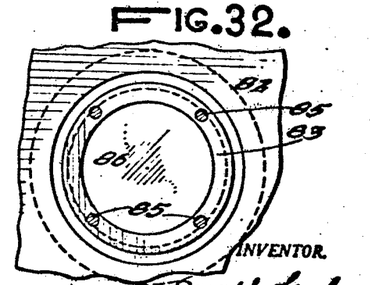
Figure 32 is a horizontal section on the line 32—32, Figure 1.
Figure 33:
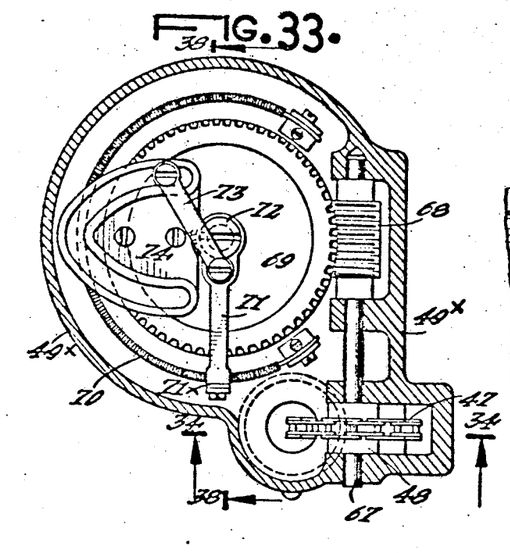
Figure 33 is a horizontal section taken on the line 33—33, Figure 37, showing an automatic control of the light intensity driven from the bracket-carrying member for the camera-enlarger, a rheostat being shown as the means for controlling the light intensity, the position of the elements showing low light intensity for a relatively small enlargement.
Figure 34:
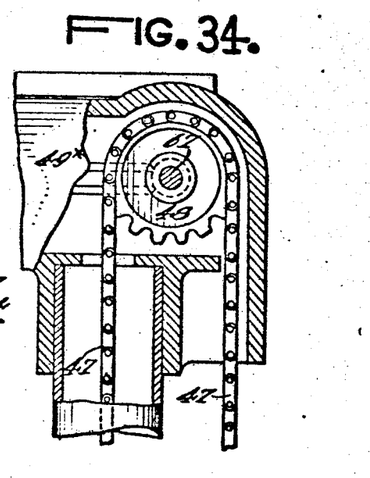
Fig. 34 is a vertical section taken on the line 34—34, Figure 33.
Figures 35, 36:
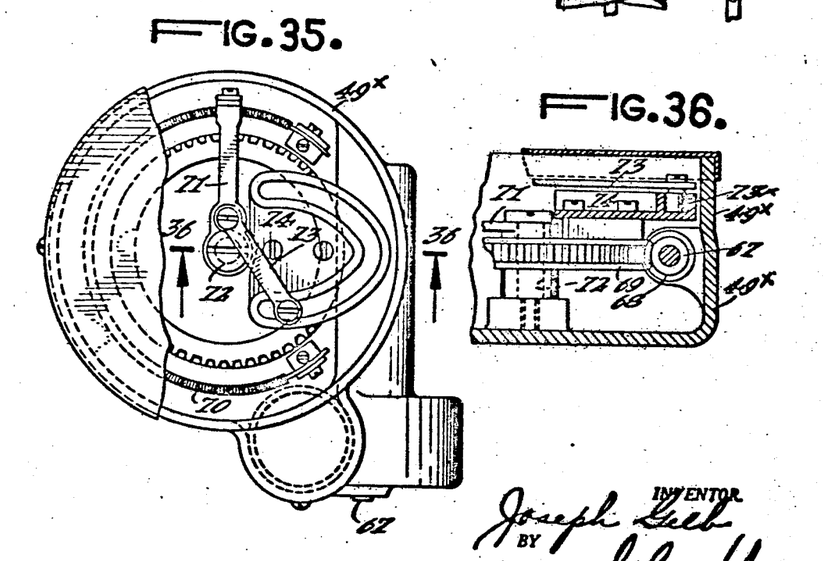
Figure 35 is a view similar to Figure 33, showing the position of the rheostat controls for high light intensity as applied to relatively large enlargements.
Figure 36 is a fragmentary vertical section on the line 36—36, Figure 35.

A modified form of automatic control of illumination is illustrated in Figures 29 to 30 inclusive. Within the lamp house is a fixed Polaroid plate 78 below which is a movable Polaroid plate 79 carried by a ring 79x connected by rods 80 to a rotary carrier 81. Polaroid plate 79 is so related to Polaroid plate 78 that rotation thereof in one direction will have a screening effect upon the beam of light from the lamp L whereas rotation in the opposite direction will have a reverse effect.

The base cap of the lamp house, shown at 82, is formed with an internally threaded tubular neck 82x which receives the exteriorly threaded lens carrier 83 at the lower end of which is lens holder 84. The lens carrier is secured by screws 85 to the rotary carrier 81 for the lower Polaroid plate. The focusing lens is shown at 86, and when it is moved upwardly by the instrumentalities above described, the length of focus will be shortened, the size of the image increased and the intensity of the light beam increased by the relative movement of the Polaroid plate. It will be understood that in substitution of Polaroid plates, any other form of mechanical light controlling shields may be employed.

Figure 26:
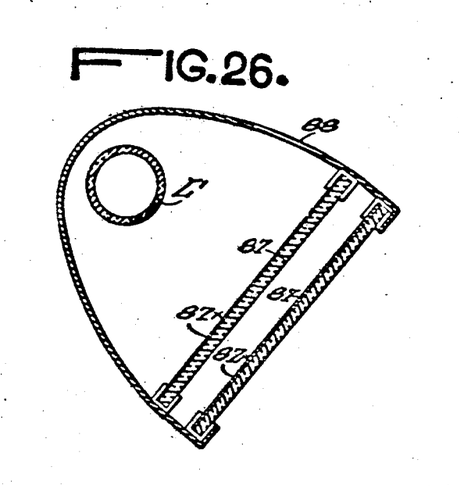
Figure 26 is a view of a different type of lamp house or lamp unit showing a light source below the same, superposed fluorescent or phosphor-fluorescent members.
Figure 28:
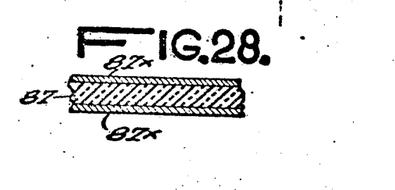
Figure 28 is a view similar to Figure 27, showing the fluorescent or phosphor-fluorescent coating applied to both faces of the member.

Increase of light with ultra-violet output and phosphor-fluorescent surfaced members In Figures 25 to 28 of the drawings I have illustrated means for increasing light intensity by the use of a lamp or lamps with ultra-violet output in conjunction with phosphor-fluorescent surfaced light receiving members. In Figure 25 the brackets 66 within the lamp house support a glass plate 87 having a phosphor-fluorescent or fluorescent surface 87x. In such case the lamp above plate 87 will be a quartz lamp or other type producing ultra-violet output. By such means a more uniform and stronger light intensity is produced. In Figure 26 a light reflector 88 is employed within the lamp house, or as a lamp house for reception of a lamp indicated at L' and two glass plates 87 having fluorescent or phosphor-fluorescent coatings 87x are employed. As shown in Figure 28 the glass plate may have coatings on its opposite faces if desired.

Figure 26A:
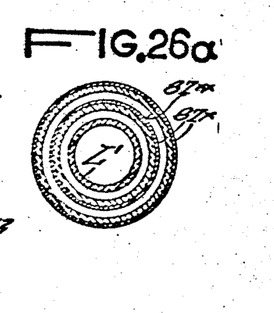
Figure 26A is a transverse section through a modified arrangement for increasing intensity of the light, comprising essential light source and two coaxial and surrounding tubular fluorescent or phosphor-fluorescent units.
Figure 27:
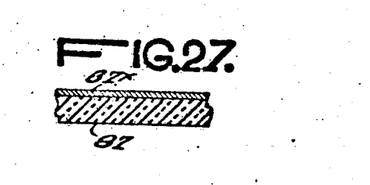
Figure 27 is an enlarged section taken through the fluorescent or phosphor-fluorescent member of Figure 25.

In the form illustrated in Figure 26A the lamp L' is surrounded by two glass tubes 87xx each having fluorescent or phosphor-fluorescent coatings 87x. These tubes are preferably sealed.

Focusing adapter employing a light ray

Figure 22:
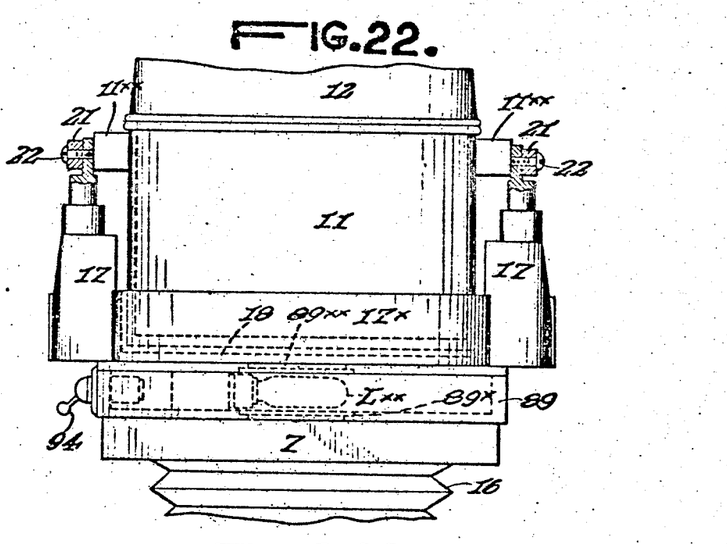
Figure 22 is a view in front elevation showing the lower section of the lamp house and certain elements of the pressure plate and control therefor, partly in section, and illustrating in position below the pressure plate a focusing unit which includes a lamp energized by a battery controlled by a switch, the lamp throwing a beam from the same plane as a film to be enlarged so that sharpness of the beam thrown from the clear lamp focusing unit may be reached by adjustment to determine the proper focus.
Figure 23:
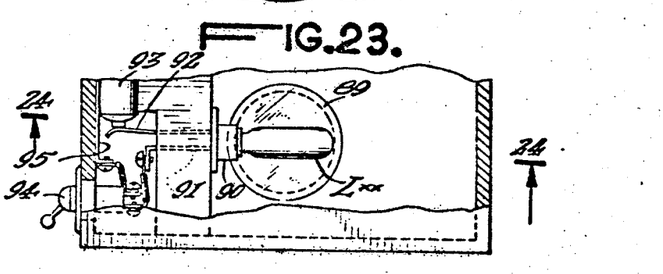
Figure 23 is a fragmentary plan view of the focusing unit, partly broken away.
Figure 24:
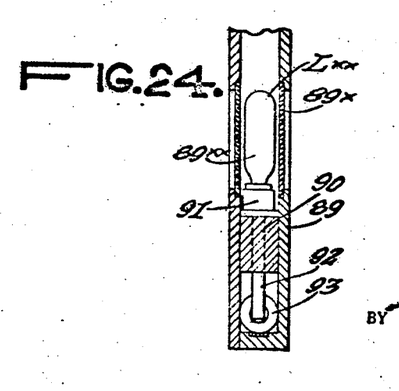
Figure 24 is a vertical section on the line 24—24, Figure 23, looking in the direction of the arrows.

In Figures 22 to 24 inclusive, I have illustrated a self-contained assembly within a shallow box adapted to be inserted under the pressure plate for generating a ray of light at the horizontal plane in which the negative normally lies and for throwing the ray downwardly so that by means of the focusing adjustments the point of light thrown upon a surface on the board 1 may be brought to the required sharpness, without the necessity of studying an image light projected from a negative in order to determine sharpness of focus. The box is shown at 89. Its lower wall is provided with a transparent window 89x and there may be a second window above the same as shown at 89xx. A block 90 supports a small lamp Lxx in a socket 91 connected to contact 92 for a small battery 93, and the socket is connected to a switch 94 disposed exteriorly of the box and adapted to open and close the circuit through the lamp via lead 95.

After the focusing operation, box 89 may be quickly removed and the negative within its negative-holding plate inserted followed by downward movement of the clamping plate, that is to say, the pressure plate 16.

The copy back with adjustable mirror

Figures 15, 16, 17:
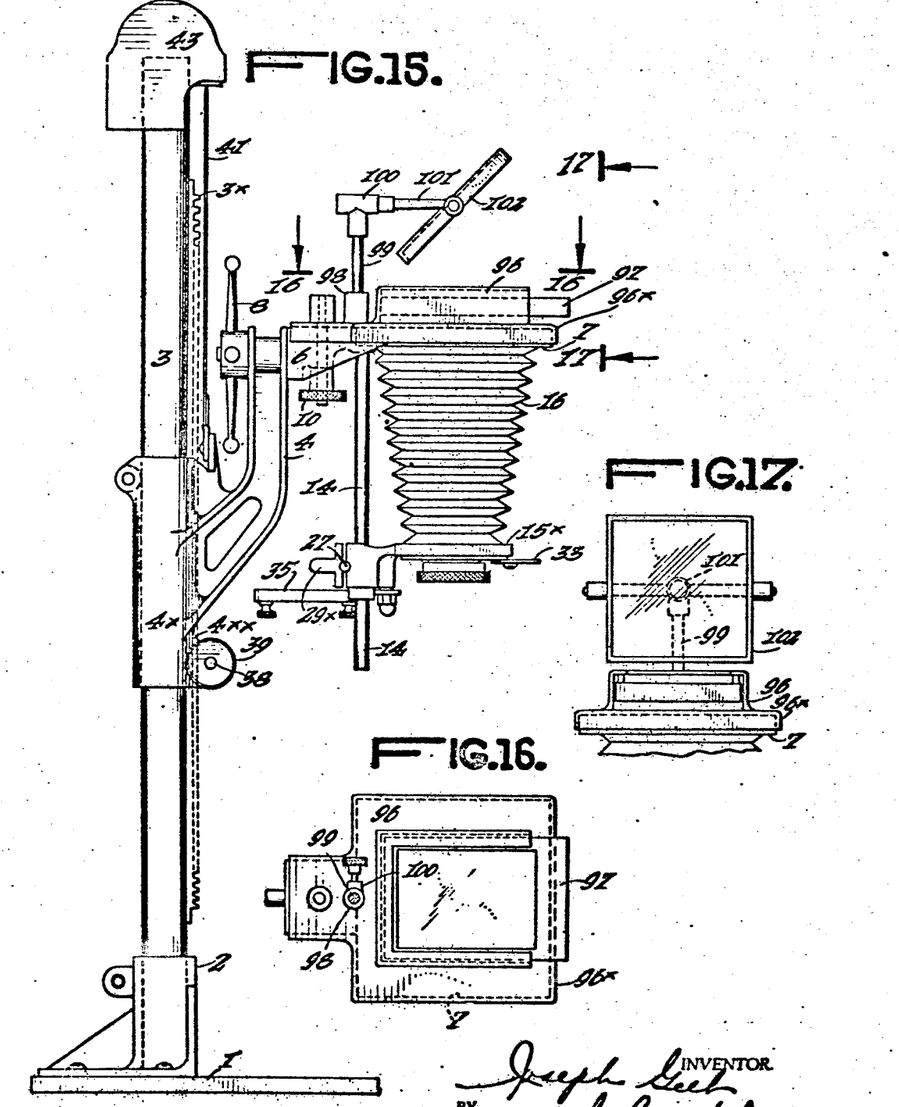
Figure 15 is a view in elevation, similar to Figure 1, showing the appearance of the structure after removal of the lamp house and the application of a camera back and a reflecting mirror.
Figure 16 is a plan view, partly in section, taken on the line 16—16, Figure 15.
Figure 17 is a fragmentary view in elevation from the line 17—17, Figure 15, looking in the direction of the arrows.

In Figures 15 to 17 inclusive, I have illustrated a copy back and adjustable mirror applied to ring 7 of block 6 when the lens-holder and surmounted lamp house are removed. The copy back comprises a plate holder 96 having a marginal depending flanged area 96x adapted to be received upon ring 7. In Figures 15 and 16 of the drawings the plate holder is shown as receiving a focusing glass 97. The plate holder supports a socket 98 which in turn carries a rod 99 and adjustably mounted on the rod is a bracket 100 carrying a horizontal arm 101 to which is pivoted a mirror 102. Thus the mirror may be given a limited vertical adjustment and also may be swung angularly on its pivot. The illuminated copy having been placed under the lens at the lower end of the bellows, the illuminated image will be reflected upon the mirror and by adjusting the position of the lens relatively to the copy, a sharp focus may be visualized by means of the mirror when the proper focusing adjustment has been reached.

Wall mounting for the camera-enlarger

Figures 18, 19, 20, 21:
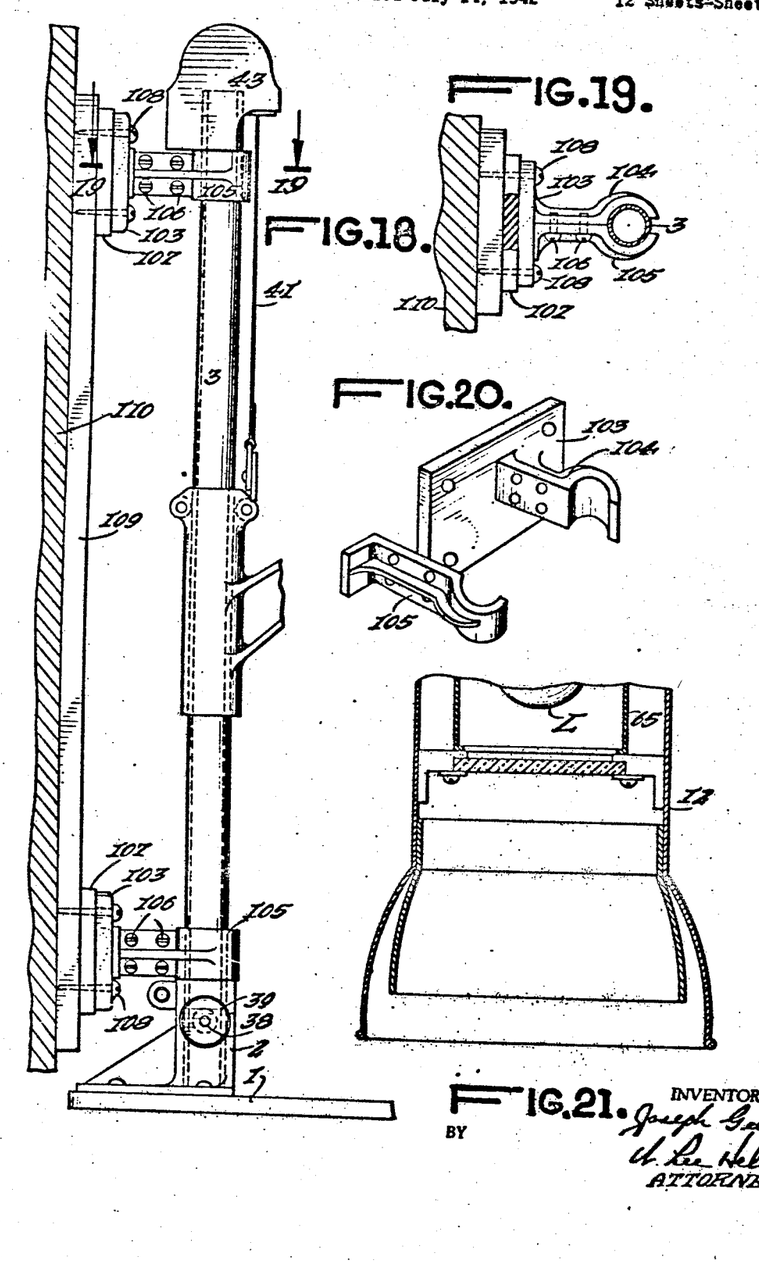
Figure 18 is a detailed view in side elevation, partly broken away, showing the mounting of the tubular standard on a wall by means of wall brackets.
Figure 19 is a horizontal section on the line 19—19, Figure 18.
Figure 20 is a perspective view, showing one of the bracket units with its two elements separated.
Figure 21 is a fragmentary vertical section through the lamp house showing a heat-absorbing member disposed below a tubular heat-absorbing member surrounding the lamp.

In Figures 18 to 20 inclusive the tubular standard 3 is shown associated with a wall mounting comprising upper and lower bracket plates 103, each formed with an arm 104 curved at its outer end to conform with the standard. A separate arm complementary to arm 104 is shown at 105 the two arms being formed with screw-receiving apertures. The apertures of arm 104 will be threaded. When the standard 3 is held by the arms completing one of the brackets, the assembly will be that of Figure 19, the screws being indicated at 106. The base of each bracket 103 receives an insulation block 107 and is secured by screws 108 to a wall board 109 which board may be secured to a wall (indicated at 110). Thus the standard 3 and the camera-enlarger carried thereby may be mounted upon a wall very readily and may be quickly removed therefrom by taking out the screws 106 which secure the two complementary bracket arms to their coacting arms 104.

It will be understood that various modifications may be made in the form and arrangement of the elements illustrated in the embodiments of the invention, without departing from the spirit of the invention.

The purpose of the insulation blocks 107 are to isolate the camera-enlarger from vibrations which may be carried to the wall to which the device is mounted. While the blocks are shown of solid material, it will be understood that a spring connection between the wall board 109 and each of the brackets 103 will constitute the equivalent of the blocks.

Having described my invention, what I claim and desire to secure by Letters Patent, is as follows:

1. In a device of the character described, a lamp house, a negative support, and a condenser housing, a negative pressure plate above the negative support, spiral spring pressure means directly engaging and bearing upon the plate, and manually operated means for moving the plate against the action of the spring pressure means, the pressure plate being a ring-shaped member formed with an inner upwardly directed guiding flange, a condenser casing below the lamp house and serving as a guide for cooperation with said flange, bosses carried by the pressure plate and formed with vertical passageways, ears projecting from the condenser casing and entering said passageways, rods connected to the pressure plate and each projecting through one of said ears and the appropriate boss, a spring intermediate each ear and the pressure plate, the lever having areas each connected to one of said rods.

2. In a device of the character described, and in combination with a lamp house, a negative support, a spring-engaged pressure plate and manually operable means for moving the plate away from the negative support, of a pair of negative carrying plates each formed with a plurality of surface deformations, the deformations projecting at one face of the plate and being countersunk relatively to the opposite face of the plates, the projecting deformations of either one of the two plates being adapted to be received within the countersunk deformation of the other plate, and the negative support having registration faces adapted to register with the said projecting deformations.

3. In a device of the character described, in combination, a condenser casing provided with a plurality of laterally projecting apertured ears, a negative support, a negative pressure plate above the said negative support provided with a plurality of cups at peripheral points beyond the said condenser casing, the upper ends of the said cups being enlarged and apertured, the said negative pressure plate being further provided with uprising studs secured at their upper ends in the said apertured cup enlargement and slidably received in the said apertured ears of the condenser casing, and spiral springs encircling the said studs and disposed between the said negative pressure plate and the said ears, the said cups of the pressure plate enclosing and concealing the said springs and condenser casing ears.

4. The combination according to claim 2 wherein the said negative support is provided with registration faces presenting a square opening and wherein the said deformations of the said negative carrying plates are located on lines which define the sides of a square.

JOSEPH GELB.